(12) United States Patent
Lim et al.

(10) Patent No.: US 12,443,205 B2
(45) Date of Patent: Oct. 14, 2025

(54) ELECTRONIC DEVICE AND CONTROL METHOD THEREOF

(71) Applicants: Hyundai Motor Company, Seoul (KR); Kia Corporation, Seoul (KR)

(72) Inventors: Chan Mo Lim, Suwon-si (KR); Seok Won Kim, Hwaseong-si (KR); Jung Min Ryu, Hwaseong-si (KR); Yun Jae Kim, Seongnam-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 60 days.

(21) Appl. No.: 18/616,581

(22) Filed: Mar. 26, 2024

(65) Prior Publication Data

US 2025/0189989 A1    Jun. 12, 2025

(30) Foreign Application Priority Data

Dec. 11, 2023    (KR) .................. 10-2023-0179094

(51) Int. Cl.
*G05D 1/69*    (2024.01)
*G05D 1/692*    (2024.01)
*G05D 1/693*    (2024.01)
*G05D 1/698*    (2024.01)

(52) U.S. Cl.
CPC ............. *G05D 1/692* (2024.01); *G05D 1/693* (2024.01); *G05D 1/6987* (2024.01)

(58) Field of Classification Search
CPC ....... G05D 1/692; G05D 1/693; G05D 1/6987
See application file for complete search history.

(56) References Cited

U.S. PATENT DOCUMENTS

2019/0315592 A1    10/2019  Machida et al.
2021/0122606 A1    4/2021   Kim et al.

FOREIGN PATENT DOCUMENTS

| CN | 115636309 A | 1/2023 |
| JP | 2023085960 A | 6/2023 |
| JP | 7415064 B1 | 1/2024 |
| KR | 20210049566 A | 5/2021 |
| KR | 20220102379 A | 7/2022 |
| KR | 20220118327 A | 8/2022 |
| KR | 20220132743 A | 10/2022 |
| KR | 20230022139 A | 2/2023 |

*Primary Examiner* — Mathew Franklin Gordon
(74) *Attorney, Agent, or Firm* — Slater Matsil, LLP

(57) ABSTRACT

An electronic device can include one or more processors, and a storage medium storing computer-readable instructions that enable the one or more processors to receive target robot state information and a target robot boarding request of a target robot that is to board a transport apparatus, from the target robot, determine a target robot boarding condition of the target robot, through comparison of a standby robot boarding order of a standby robot and a target robot boarding order of the target robot, where the standby robot is different from the target robot, and where the standby robot is located in a standby area, and transmit a get-off command to the target robot for the target robot to get off from the transport apparatus, based on a destination of the transport apparatus on which the target robot has boarded, depending on the target robot boarding condition.

20 Claims, 9 Drawing Sheets

ELECTRONIC DEVICE AND CONTROL METHOD THEREOF

CROSS-REFERENCE TO RELATED APPLICATIONS

This application claims the benefit of priority to Korean Patent Application No. 10-2023-0179094, filed in the Korean Intellectual Property Office on Dec. 11, 2023, the entire contents of which are incorporated herein by reference.

TECHNICAL FIELD

The present disclosure relates to controlling robots.

BACKGROUND

As the robot industries develop, robots from many manufacturers or operators are being mixed and used for different purposes in the same building (or area). However, each robot cannot know the existence of other robots (e.g., dissimilar models). Furthermore, if moving while boarding a transport apparatus (e.g., an elevator), each robot encounters a collision or a stalemate with a third-party robot if trying to board it while ignoring the third-party robot on board or a robot that stands by. The situation leads to a case in which a delay in a robot service using an elevator is caused.

In particular, existing robot control systems may only manage robots from each manufacturer. The existing robot control system provides elevator boarding services to the robots by linking with an elevator through a server of an elevator manufacturer. In such a system, multiple dissimilar robots may attempt to board the elevator at the same time, or may attempt to board the elevator even though there is a robot that is getting off. Multiple dissimilar robots may interfere with progresses thereof, and may delay or make the elevator service impossible. The existing robot control system reduces the quality of the service of the robot and provides inconvenience to customers. The operation of the elevator due to a delay time (e.g., a forced closing of a door) may cause damage to the robot and elevator, and may cause after-sales service costs and service gaps.

SUMMARY

The present disclosure relates to an electronic device and a control method thereof, and more particularly, to a technology for controlling boarding of a robot to a transport apparatus.

The present disclosure has been made to solve the above-mentioned problems occurring in the prior art while advantages achieved by the prior art are maintained intact. To solve the above-mentioned problems, there is a need for an embodiment of the present disclosure that can control boarding of the robot to the transport apparatus by acquiring locations and states of the robots through interworking between robots.

An embodiment of the present disclosure can provide an electronic device and a control method, by which a boarding condition of a target robot may be determined through a boarding order of a standby robot that is different from the target robot and is located in a standby area and a boarding order of the target robot whereby the target robot and the standby robot do not directly communicate with a server of a transport apparatus whereby a burden on the server of the transport apparatus may be reduced, a call of an API for each type of the robot may be omitted, and development costs of the robot may be reduced.

An embodiment of the present disclosure can provide an electronic device and a control method, by which a boarding order of the a target robot may be determined based on at least one of a remaining battery charge of the target robot, a type of the target robot, or a service state of the target robot, or any combination thereof, from state information, whereby a bottle neck phenomenon that occurs due to the robots that are waiting for boarding in an interior of a transport apparatus or in a space, in which the transport apparatus is located, and a quality of a service may be improved by preferentially determining a boarding order depending on an emergency or urgency priority for each service of the robot.

An embodiment of the present disclosure can provide an electronic device and a control method, by which a first communication device or a second communication device may be determined based on at least one of an intensity of a signal or a latency of the signal, or any combination thereof, for communication with a robot whereby interruption of a network due to an issue, such as a shielded and/or shaded area when a robot moves to a destination after boarding.

Technical problems to be solved by embodiments of the present disclosure are not necessarily limited to the aforementioned problems, and solutions by an embodiment of the present disclosure to other technical problems not mentioned herein can be clearly understood from the following description by those skilled in the art to which the present disclosure pertains.

According to an embodiment of the present disclosure, an electronic device can include a memory that stores computer-executable instructions, and at least one processor that accesses the memory and execute the instructions, and the at least one processor can receive state information and a boarding request of a target robot that is to board a transport apparatus, from the target robot, determine a boarding condition of the target robot, through comparison of a boarding order of a standby robot being different from the target robot and located in a standby area, and a boarding order of the target robot, and transport a get-off command to the target robot such that the target robot gets off from the transport apparatus, based on a destination of the transport apparatus which the target robot has boarded, depending on the boarding condition.

In an embodiment, the at least one processor may transmit a movement command to the target robot such that the target robot moves to the standby area, based on that the standby robot located in the standby area is identified, and transmit a boarding command and information on the transport apparatus to the target robot such that the target robot boards the transport apparatus, based on that the standby robot located in the standby area is not identified or based on the boarding condition of the target robot.

In an embodiment, the at least one processor may identify at least one of a remaining battery charge of the target robot, a type of the target robot, or a service state of the target robot, or any combination thereof, from the state information, determine the boarding order of the target robot, based on at least one of the remaining battery charge of the target robot, the type of the target robot, or the service state of the target robot, or any combination thereof, and determine the boarding order of the standby robot, based on at least one of a remaining battery charge of the standby robot, a type of the standby robot, or a service state of the standby robot, or any combination thereof.

In an embodiment, the at least one processor may receive a request of a user who uses the target robot, based on that the target robot is a delivery robot, skip determination of the boarding condition of the target robot, based on that the request of the user is an urgent request, and transmit a boarding command to the target robot such that the target robot boards the transport apparatus, based on that the determination of the boarding condition of the target robot has been skipped.

In an embodiment, the at least one processor may through a user interface (UI) that receives a request of a user, receive a request for registration of the target robot, correction of the target robot, and deletion of the target robot, from the user, or receive setting information on check of the transport apparatus and whether a dedicated operation is possible, from the user.

In an embodiment, the at least one processor may identify a mac address of the target robot and a secret key of the target robot from the state information, based on that the state information and the boarding request have been received, perform an authentication on the target robot, based on the mac address and the secret key, and determine the boarding condition of the target robot, based on that the target robot is an authenticated robot.

In an embodiment, the at least one processor may generate a json web token (JWT) regarding the authentication of the target robot, based on the mac address and the secret key, perform a verification on a signature of the JWT token, and identify a payload included in the JWT based on that the verification of the signature has been performed.

In an embodiment, the at least one processor may receive the state information and the boarding request, through a first communication device regarding a long-distance communication, and receive the state information and the boarding request, through a second communication device regarding a short-distance communication, based on at least one of an intensity of a signal received through the first communication device or a latency of the signal, or any combination thereof.

In an embodiment, the at least one processor may transmit at least one of identification information of the target robot, a boarding point of the target robot, a get-off point of the target robot, movement information of the transport apparatus, the boarding condition of the target robot, or the standby area of the target robot, or any combination thereof, to the target robot, based on that the boarding condition of the target robot has been determined.

In an embodiment, the at least one processor may disable a service related to boarding of the transport apparatus of the target robot, based on that the get-off command has been transmitted to the target robot, and generate command data regarding a service that is to be provided by the target robot, at a time point that is subsequent to a time point, at which the get-off command is transmitted.

In an embodiment, the at least one processor may identify at least one of movement information of the standby robot or movement information of the transport apparatus which the standby robot is to board, or any combination thereof, based on that the standby robot located in the standby area has been identified, generate a target group including the standby robot and the target robot, based on the movement information of the standby robot, the movement information of the transport apparatus which the standby robot is to board, or the state information of the target robot, and transmit a boarding command such that robots included in the target group board the transport apparatus, to the robots.

According to an embodiment of the present disclosure, a control method can include receiving state information and a boarding request of a target robot that is to board a transport apparatus, from the target robot, determining a boarding condition of the target robot, through comparison of a boarding order of a standby robot being different from the target robot and located in a standby area, and a boarding order of the target robot, and transporting a get-off command to the target robot such that the target robot gets off from the transport apparatus, based on a destination of the transport apparatus which the target robot has boarded, depending on the boarding condition.

In an embodiment, the transmitting of the get-off command to the target robot may include transmitting a movement command to the target robot such that the target robot moves to the standby area, based on that the standby robot located in the standby area is identified, and transmitting a boarding command and information on the transport apparatus to the target robot such that the target robot boards the transport apparatus, based on that the standby robot located in the standby area is not identified or based on the boarding condition of the target robot.

In an embodiment, the determining of the boarding condition of the target robot may include identifying at least one of a remaining battery charge of the target robot, a type of the target robot, or a service state of the target robot, or any combination thereof, from the state information, determining the boarding order of the target robot, based on at least one of the remaining battery charge of the target robot, the type of the target robot, or the service state of the target robot, or any combination thereof, and determining the boarding order of the standby robot, based on at least one of a remaining battery charge of the standby robot, a type of the standby robot, or a service state of the standby robot, or any combination thereof.

In an embodiment, the determining of the boarding condition of the target robot may include receiving a request of a user who uses the target robot, based on that the target robot is a delivery robot, skipping determination of the boarding condition of the target robot, based on that the request of the user is an urgent request, and transmitting a boarding command to the target robot such that the target robot boards the transport apparatus, based on that the determination of the boarding condition of the target robot has been skipped.

In an embodiment, the determining of the boarding condition of the target robot may include identifying a mac address of the target robot and a secret key of the target robot from the state information, based on that the state information and the boarding request have been received, performing an authentication on the target robot, based on the mac address and the secret key, and determining the boarding condition of the target robot, based on that the target robot is an authenticated robot.

In an embodiment, the determining of the boarding condition of the target robot may include generating a json web token (JWT) regarding the authentication of the target robot, based on the mac address and the secret key, performing a verification on a signature of the JWT token, and identifying a payload included in the JWT based on that the verification of the signature has been performed.

In an embodiment, the receiving of the state information and the boarding request may include receiving the state information and the boarding request, through a first communication device regarding a long-distance communication, and receiving the state information and the boarding request, through a second communication device regarding a short-distance communication, based on at least one of an intensity of a signal received through the first communication device or a latency of the signal, or any combination thereof.

In an embodiment, the determining of the boarding condition of the target robot may include transmitting at least one of identification information of the target robot, a boarding point of the target robot, a get-off point of the target robot, movement information of the transport apparatus, the boarding condition of the target robot, or the standby area of the target robot, or any combination thereof to the target robot, based on that the boarding condition of the target robot has been determined.

In an embodiment, the control method may further include identifying at least one of movement information of the standby robot or movement information of the transport apparatus which the standby robot is to board, or any combination thereof, based on that the standby robot located in the standby area has been identified, generating a target group including the standby robot and the target robot, based on the movement information of the standby robot, the movement information of the transport apparatus which the standby robot is to board, or the state information of the target robot, and transmitting a boarding command such that robots included in the target group board the transport apparatus, to the robots.

BRIEF DESCRIPTION OF THE DRAWINGS

The above and other features and advantages of the present disclosure can be more apparent from the following detailed description taken in conjunction with the accompanying drawings, in which.

In relation to the description of the drawings, identical or similar reference numerals may be used for identical or similar components.

DETAILED DESCRIPTION OF ILLUSTRATIVE EMBODIMENTS

Figure 1:
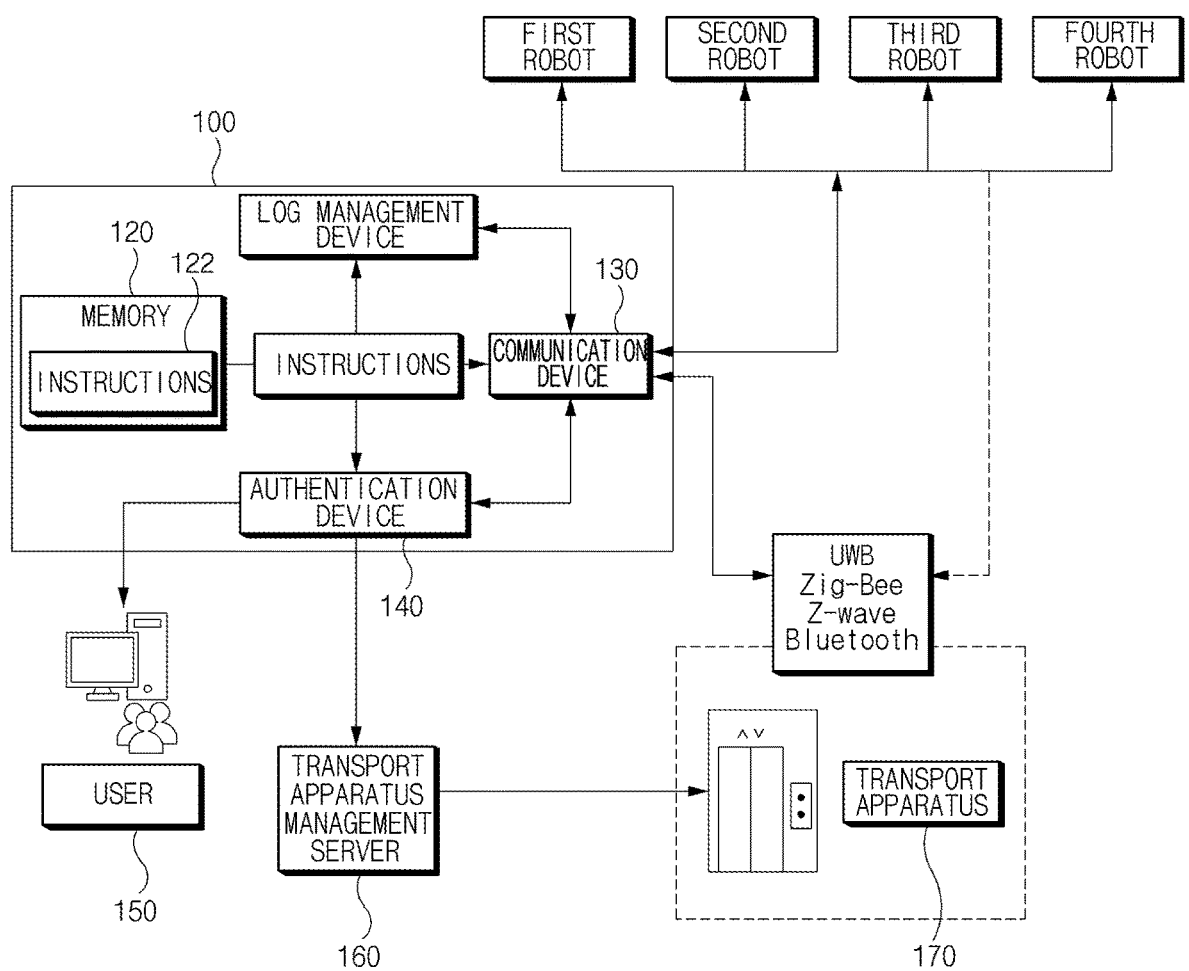
FIG. 1 is a view illustrating an electronic device according to an embodiment of the present disclosure.

Hereinafter, some example embodiments of the present disclosure will be described in detail with reference to the accompanying drawings. In adding reference numerals to the components of the drawings, it can be noted that same components can be denoted by same reference numerals even if they are drawn in different drawings. Furthermore, in describing the example embodiments of the present disclosure, if it is determined that a detailed description of related known configurations and functions may hinder understanding of the example embodiments of the present disclosure, a detailed description thereof can be omitted. In particular, various example embodiments of the present disclosure can be described with reference to the accompanying drawings, which are not intended to limit the technology described in the present disclosure to the specific example embodiments. The present disclosure can be understood to include various modifications, equivalents, and/or alternatives to the example embodiments of the present disclosure.

In describing the components of the embodiment according to the present disclosure, terms such as "first", "second", "A", "B", "(a)", "(b)", and the like, may be used. Such terms can be merely intended to distinguish one component from another component, and such terms do not necessarily limit the nature, sequence, or order of the constituent components. Unless otherwise defined, terms used herein, including technical or scientific terms, can have same meanings as those generally understood by those skilled in the art to which the present disclosure pertains. Such terms as those defined in a generally used dictionary can be interpreted as having meanings equal to the contextual meanings in the relevant field of art. For example, expressions, such as "a first," "a second," "the first," or "the second," used in the present disclosure can refer to various components in any order and/or importance, and may be only used to distinguish one component from another component and do not necessarily limit the components. For example, a first user device and a second user device may refer to different user devices regardless of order or importance. For example, a first component may be renamed a second component without departing from the scope of rights described in the present disclosure, and similarly, a second component may also be renamed a first component.

In the present disclosure, expressions, such as "have," "may have," "includes," or "may include" indicate the presence of the corresponding feature (e.g., a numerical value, a function, an operation, or a component such as a part), and does not rule out the presence of additional features.

When it is mentioned that a component (e.g., a first component) is "(functionally or communicatively) coupled with/to" or "connected" to another component (e.g., a second component), it can be understood that the certain component may be connected directly to the other component or may be connected through another component (e.g., a third component). On the other hand, if it is mentioned that a component (e.g., a first component) is "directly connected" or "directly electrically connected" to another component (e.g., a second component), it may be understood that there is no component (e.g., a third component) between the component and the other component.

The expression "configured to" used in the present disclosure may be used as, depending on the context, for example, "suitable for," "having the capacity to", "designed to," "adapted to," "made to," or "capable of."

The term "configured (or set to)" may not necessarily mean "specifically designed to" in hardware. Instead, in some situations, the expression "device configured to" may mean that the device is "capable of" working with other devices or components. For example, the phrase "processor configured (or set) to perform A, B, and C" may refer to a processor dedicated to performing the operations (e.g., an embedded processor) or a general-purpose processor (e.g., a CPU or an application processor) capable of performing the corresponding operations by executing one or more software programs stored on a memory device. Terms used in the present disclosure can be merely used to describe specific example embodiments and may not be intended to necessarily limit the scope of other embodiments. Singular expressions may include plural expressions, unless the context clearly indicates otherwise.

In the present disclosure, expressions, such as "A or B," "at least one of A or/and B," or "one or more of A or/and B", may include all possible combinations of the items listed together. For example, "A or B," "at least one of A and B," or "at least one of A or B" (1) may include at least one A, (2) may include at least one B, or (3) may refer to all cases including both at least one A and at least one B. Additionally, in describing the components of the embodiments of the present disclosure, the phrase, such as "A or B", "at least one of A and B", "at least one of A or B", "A, B or C", "A, B, and C," "at least one of A, B, or C," and "at least one of A, B, C, or any combination thereof," may include any one of the items listed together, or any possible combination of them. In particular, phrases, such as "at least one of A, B, or C, or any combination thereof", may include A or B or C or a combination thereof such as AB or ABC, for example.

Hereinafter, some example embodiments of the present disclosure will be described in detail with reference to FIGS. 1 to 9.

FIG. 1 is a view illustrating an electronic device according to an embodiment of the present disclosure.

An electronic device 100 according to an embodiment may include a processor 110, a memory 120 including instructions 122, a communication device 130, an authentication device 140, and a log management device, any combination of or all of which may be in plural or may include plural components thereof.

The electronic device 100 may refer to a device that determines a boarding condition of a target robot that is to board a transport apparatus 170. In detail, the electronic device 100 may be an interface server of the transport apparatus 170. The electronic device 100 may respond to a boarding request of the target robot. For example, the transport apparatus 170 may refer to an apparatus that may move a robot (e.g., the target robot). The transport apparatus 170 may include an elevator by way of example, but the present disclosure is not limited thereto. The transport apparatus 170 may move the target robot, robots that are different from the target robot, and a user. The target robot may transmit the boarding request to the electronic device 100 to board the transport apparatus 170. The target robot may include at least one of a delivery robot, a patrol robot, or a guide robot, or any combination thereof by way of example, but the present disclosure is not limited thereto. The target robot may move according to commands from the electronic device 100. By way of example, the target robot may receive a command from the electronic device 100 and board the transport apparatus 170 according to the received command. As illustrated in FIG. 1, the target robot may be at least one of first to fourth robots. The boarding condition is a condition that is determined by the electronic device 100, and may include a condition under which the target robot may board the transport apparatus 170. The boarding condition may include a condition, in which the target robot boards the transport apparatus 170, and a condition, in which the target robot cannot board the transport apparatus 170.

The electronic device 100 may receive state information of the target robot and a boarding request from the target robot. For example, the state information of the target robot may include states of the target robot at a time point, at which the target robot transmits the boarding request to the electronic device 100. In detail, the state information of the target robot may include at least one of a type of the target robot, a manufacturer of the target robot, a performance of the target robot, or a function of the target robot, or any combination thereof, but the present disclosure is not limited thereto.

The electronic device 100 may identify an area (e.g., a target area), in which the target robot is located, and an area (e.g., a standby area), in which a robot that is different from the target robot is located. The target robot may be located in the target area or the standby area, and a standby robot may be located in the standby area. The electronic device 100 may identify the standby robot located in the standby area. The electronic device 100 may determine boarding orders (i.e., the orders, in which the robots board the transport apparatus 170) of the robots (e.g., including the target robot and the standby robot).

The electronic device 100 may determine the boarding condition of the target robot through comparison of the boarding orders of the robots. That is, the electronic device 100 may determine the boarding orders of the robots located in the target area and the standby area, and determine the boarding condition of the target robot based on the determined boarding order. The electronic device 100 may transmit a command to the target robot such that the target robot boards the transport apparatus 170 or such that the target robot gets off the transport apparatus 170, based on the determined boarding condition. A detailed description related to this will be made later relating to FIG. 5 below.

The processor 110 may execute software, and may control at least one other component (e.g., a hardware or software component) that is connected to the processor 110. The processor 110 may perform various data processing or operations in addition. For example, the processor 110 may store at least one of the state information of the target robot, the boarding request of the target robot, the boarding condition of the target robot, information on the transport apparatus 170, a remaining battery charge of the target robot, a type of the target robot, a service state of the target robot, or any combination thereof, in the memory 120.

For reference, the processor 110 may perform all operations that are performed by the electronic device 100. Accordingly, in the specification, for convenience of description, operations that are performed by the electronic device 100 will mainly described as the operations performed by the processor 110. Furthermore, in the specification, for convenience of description, it will be mainly described that the processor 110 is a single processor, but the present disclosure is not necessarily limited thereto. For example, the electronic device 100 may include at least one processor. Each of the at least one processor may perform all operations that are related to an operation of determining the boarding condition of a target robot that is to board the transport apparatus 170.

The memory 120 may temporarily and/or permanently store various data and/or information that is required to perform an operation of determining the boarding condition of the target robot that is to board the transport apparatus 170. For example, the memory 120 may store the state information of the target robot, the boarding request of the target robot, the boarding condition of the target robot, the information on the transport apparatus 170, the remaining battery charge of the target robot, the type of the target robot, or the service state of the target robot, or any combination thereof.

The communication device 130 may support communication between the electronic device 100 and the transport apparatus 170. For example, the communication device 130 may include one or more components that allow communication between the electronic device 100 and the transport apparatus 170. For example, the communication device 130 may include a short range wireless communication device, a microphone, and the like. Then, the short range communication technologies include wireless LAN (Wi-Fi), Bluetooth, ZigBee, Wi-Fi Direct (WFD), ultra-wideband (UWB), infrared Data Association (IrDA), Bluetooth Low Energy (BLE), or near field communication (NFC), but the present disclosure is not necessarily limited thereto.

The authentication device 140 may refer to a device that authenticates a robot that has sent the boarding request if receiving a boarding request from robot (e.g., the first to fourth robots). The authentication device 140 may receive information on the robot that has transmitted the boarding request through the communication device 130. The authentication device 140 may transmit an authentication result for robot that has transmitted the boarding request to a user 150 and a transport apparatus management server 160.

The user 150 may transmit a request for registration of the target robot, modification of the target robot, and deletion of the target robot through the user interface (UI) of the electronic device 100. The user 150 may transmit setting information on a check of the transport apparatus and whether a dedicated operation is possible, through the user interface of the electronic device 100.

Figure 2:
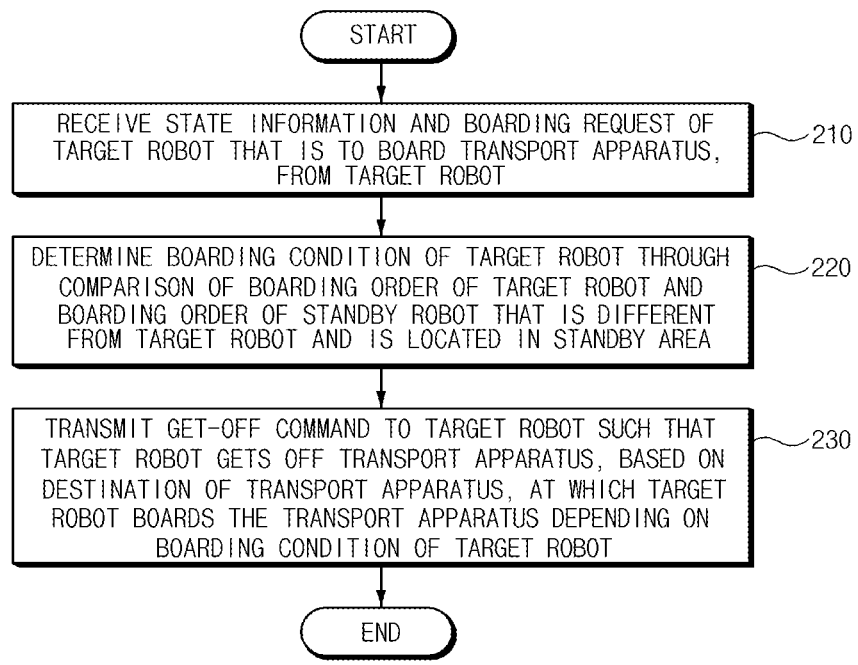
FIG. 2 is a flowchart to illustrating a control method according to an embodiment of the present disclosure.

FIG. 2 is a flowchart illustrating a control method according to an embodiment of the present disclosure.

In operation 210, an electronic device (e.g., the electronic device 100 in FIG. 1) according to an embodiment may receive state information and a boarding request of a target robot that is to board a transport apparatus (e.g., the transport apparatus 170 in FIG. 1), from the target robot. If the electronic device receives the boarding request from the target robot, it may determine a boarding condition that indicates whether the target robot may board the transport apparatus.

In operation 220, the electronic device may determine the boarding condition of the target robot through comparison of the boarding order of the target robot and the boarding order of a standby robot that is different from the target robot and is located in a standby area. For example, the boarding order may refer to an order of boarding the transport apparatus in a robot group including a plurality of robots. A method for determining the boarding order of the robot will be described in detail relating to FIG. 6 below.

In operation 230, the electronic device may transmit a get-off command to the target robot such that the target robot gets off the transport apparatus, based on a destination of the transport apparatus, at which the target robot boards the transport apparatus depending on the boarding condition of the target robot. However, the command transmitted from the electronic device to the target robot is not limited thereto. For example, the electronic device may transmit a boarding command to the target robot such that the target robot may board the transport apparatus, based on a location of the transport apparatus, at which the target robot is to board depending on the boarding condition of the target robot. The target robot may board and/or get off the transport apparatus based on the boarding condition determined by the electronic device.

Figure 3:
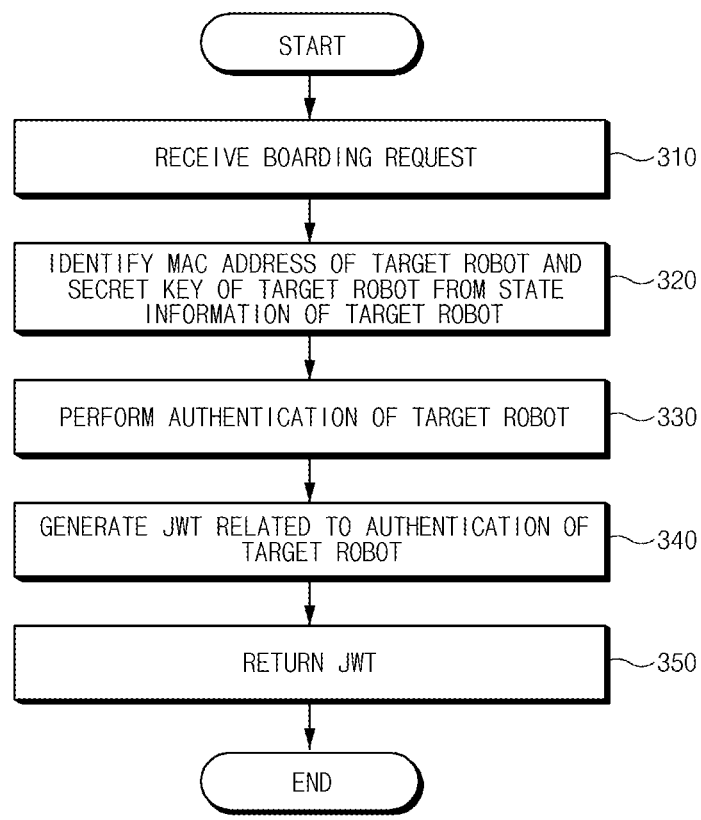
FIG. 3 is a flowchart illustrating a method for performing an authentication of a target robot in an electronic device according to an embodiment of the present disclosure.

FIG. 3 is a flowchart illustrating a method of performing an authentication of a target robot in an electronic device according to an embodiment of the present disclosure.

An electronic device (e.g., the electronic device 100 in FIG. 1) according to an embodiment may receive a boarding request from the target robot in operation 310. The target robot may transmit the boarding request to the electronic device while not transmitting the boarding request to a transport apparatus management server (e.g., the transport apparatus management server 160 of FIG. 1). The electronic device may receive a boarding request from a robot that is different from the target robot (e.g., at least one of the first to fourth robots illustrated in FIG. 1). The electronic device may receive a boarding request from a plurality of robots, and may determine a boarding condition for the transport apparatus (e.g., the transport apparatus 170 of FIG. 1) for the plurality of robots.

In operation 320, the electronic device may identify a mac address of the target robot and a secret key of the target robot from the state information of the target robot. In detail, the electronic device may receive state information and a boarding request from the target robot. The electronic device may apply the state information transmitted from the target robot to an operation of authenticating the target robot. For example, the electronic device may identify the mac address and the secret key from state information. The electronic device may perform an authentication of the target robot in the following operations, based on the mac address and the secret key.

The electronic device may perform the authentication of the target robot in operation 330. For example, the electronic device may perform the authentication of the target robot based on the mac address and the secret key, which are identified from state information. Through operation 330, the electronic device may perform an operation of determining the boarding condition only for the authenticated target robot. Through this, the electronic device may block an access of the unauthenticated (i.e., unauthorized) robots.

In operation 340, the electronic device may generate a json web token (JWT) related to the authentication of the target robot. For example, the JWT may include at least one number or letter. The JWT may include the state information of the target robot, which is input through a portable electronic device, a desktop computer, or a smartphone.

In operation 350, the electronic device may return the JWT. For example, the electronic device may return the JWT to the user (e.g., the user 150 in FIG. 1) through an authentication device (e.g., the authentication device 140 in FIG. 1). Thereafter, the electronic device may determine the boarding condition of the target robot based on that the target robot is an authenticated robot.

Figure 4:
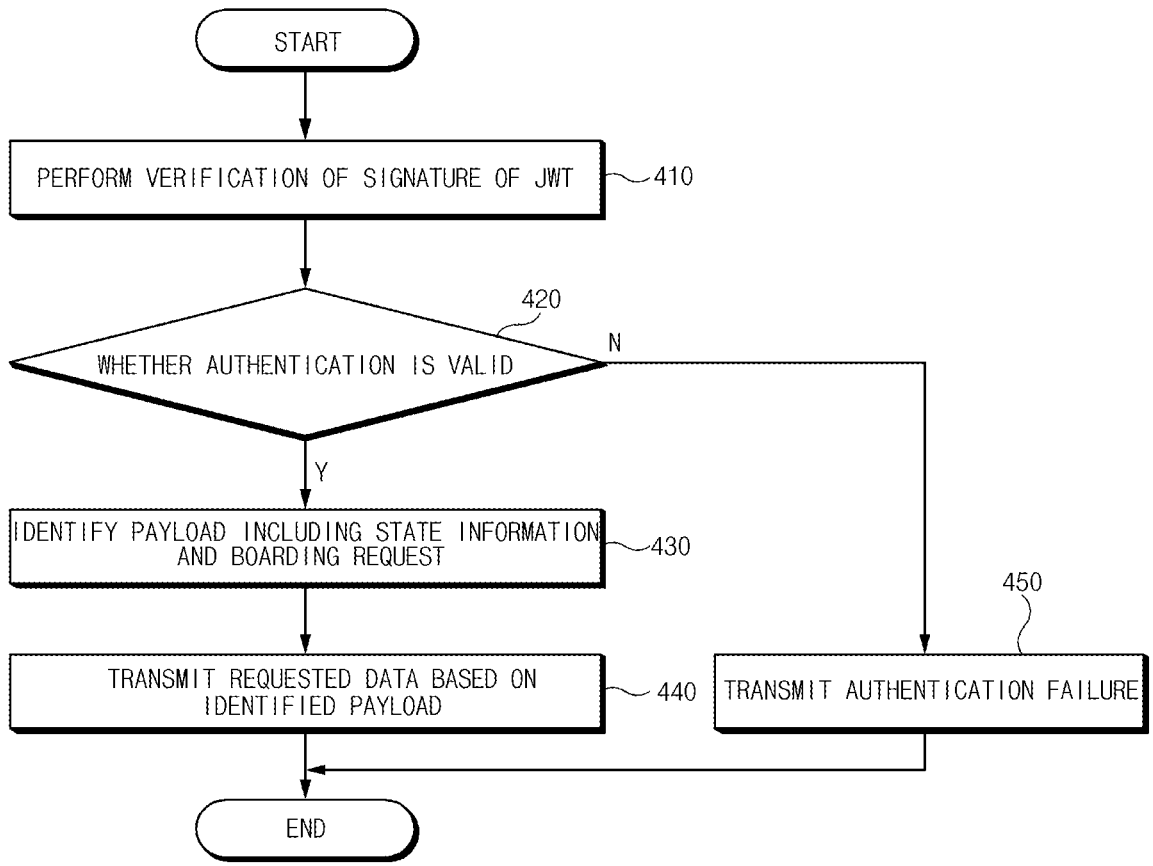
FIG. 4 is a flowchart illustrating operations according to an authentication result of a target robot in an electronic device according to an embodiment of the present disclosure.

FIG. 4 is a flowchart illustrating operations depending on the authentication result of a target robot in an electronic device according to an embodiment of the present disclosure.

In operation 410, an electronic device (e.g., the electronic device 100 of FIG. 1) according to an embodiment may perform a verification of a signature of a JWT. For example, a JWT may include data in a JSON format. In detail, the JWT may include a header, a payload, and a signature. The header may include a type and a hash algorithm of the JWT. The payload may include data, in which contents of the JWT are encoded. The signature may include data, by which it may be identified whether the JWT has been forged and/or altered. Accordingly, the electronic device may perform a verification of the signature of the JWT based on that the JWT has been generated.

In operation 420, the electronic device may determine whether the authentication is valid. For example, the electronic device may perform the authentication of the target robot based on the mac address and the secret key, which are identified from the state information of the target robot. The electronic device may determine whether the authentication of the target robot is valid through the above-described operation.

In operation 430, the electronic device may identify a payload including the state information and the boarding request based on whether the authentication is valid. For example, the electronic device may generate the JWT to receive information on the boarding request from the authenticated target robot. The electronic device may receive information on the boarding request from the target robot through the generated JWT. The electronic device may perform an operation of identifying the information on the boarding request received through the JWT, by verifying the signature of the JWT.

In operation 440, the electronic device may transmit the requested data based on the identified payload. For example, the electronic device may identify the state information of the target robot and the boarding request by identifying the payload. The electronic device may transmit data (i.e., requested data) related to boarding of the target robot to the transport apparatus, to the target robot, in response to the boarding request of the target robot.

In operation 450, the electronic device may transmit an authentication failure based on that the authentication is invalid. For example, the electronic device may transmit the authentication failure to at least one of the user (e.g., the user 150 in FIG. 1) or a transport apparatus management server (e.g., the transport apparatus management server 160 in FIG. 1), or any combination thereof.

Figure 5:
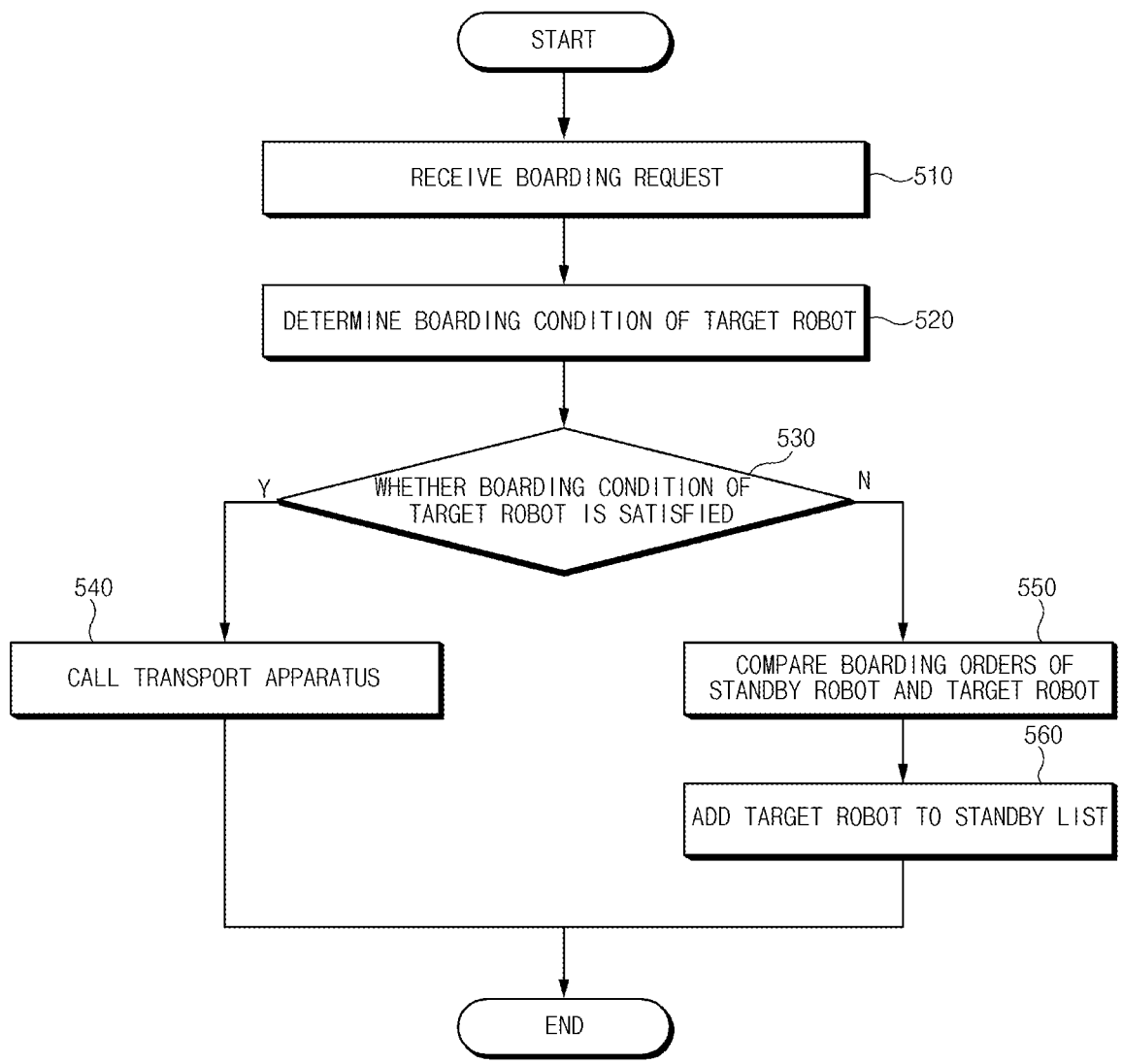
FIG. 5 is a flowchart illustrating a method for controlling a target robot based on a boarding condition of a target robot in an electronic device according to an embodiment of the present disclosure.

FIG. 5 is a flowchart illustrating a method of controlling the target robot based on a boarding condition of the target robot in an electronic device according to an embodiment of the present disclosure.

In operation 510, an electronic device (e.g., the electronic device 100 in FIG. 1) according to an embodiment may receive a boarding request in operation 510. In detail, the electronic device may receive a request for boarding to a transport apparatus (e.g., the transport apparatus 170 of FIG. 1), from the target robot.

In operation 520, the electronic device may determine a boarding condition of the target robot. For example, the electronic device may determine the boarding condition of the target robot based on an operation of identifying a standby robot in a standby area. In detail, the electronic device may individually determine the boarding condition of the target robot depending on if the standby robot is identified in the standby area and if the standby robot is not identified in the standby area. Hereinafter, operations of the electronic device related to the above-described contents will be described later.

In operations 530 to 540, the electronic device may transmit a boarding command and information on the transport apparatus to the target robot such that the target robot may board the transport apparatus, based on that the standby robot located in the standby area is not identified. In detail, the electronic device may determine the boarding condition of the target robot as enabling (e.g., a condition, in which the target robot may board the transport apparatus) of the boarding condition of the target robot, based on that the standby robot located in the standby area is not identified. However, the operation of determining the boarding condition may be performed on the premise of the operation of authenticating the target robot, which has been described above in FIGS. 3 and 4. For example, after performing an authentication of the target robot, the electronic device may determine the boarding condition of the target robot depending on whether the standby robot is identified. Accordingly, based on that the standby robot has not been identified, the electronic device may enable the boarding condition of the target robot and transmit the boarding command to the target robot. The electronic device may transmit at least one of identification information of the target robot, a boarding point of the target robot, a get-off point of the target robot, or movement information of the transport apparatus, or any combination thereof to the target robot, based on that the boarding condition of the target robot is determined as being active. The electronic device may call the transport apparatus based on that the boarding condition of the target robot is active.

The electronic device may control the target robot such that the target robot boards the transport apparatus, based on that the transport apparatus has been called. For example, the electronic device may control the target robot by transmitting the boarding command to the target robot. The electronic device may identify the state of the target robot that has boarded the transport apparatus. The electronic device may transmit a get-off command to the target robot if the target robot arrives at the destination by the transport apparatus. The electronic device may disable a service related to boarding of the target robot to the transport apparatus, based on that a get-off command has been transmitted to the target robot. In detail, the electronic device may disable the service related to the boarding of the target robot to the transport apparatus if a get-off command has been transmitted to the target robot and a standby robot located in the standby area is not present. Thereafter, the electronic device may generate command data regarding the service that is to be provided by the target robot at a time point that is subsequent to the time point, at which the get-off command is transmitted. Through this, the electronic device may control the target robot that has gotten off the transport apparatus by transmitting command data regarding the service that is to be provided by the target robot, to the target robot.

In operations 530 to 560, the electronic device may transmit a movement command to the target robot such that the target robot moves to the standby area, based on that the standby robot located in the standby area has been identified. For example, in operation 550, the electronic device may compare the boarding orders of the standby robot and the target robot. In detail, the electronic device may determine that the boarding condition of the target robot is inactive, based on that the standby robot located in the standby area has been identified. The electronic device may transmit at least one of the identification information of the target robot, the movement information of the transport apparatus, the boarding condition of the target robot, or the standby area of the target robot, or any combination thereof, to the target robot, based on that the boarding condition of the target robot has been determined to be inactive. The electronic device may add the target robot, the boarding condition of which is disabled, to a standby list. By way of example, the standby list may include a list of robots located and/or to be located in the standby area. The electronic device may control the movement of the robots located in the standby area by checking the standby list.

The electronic device may identify the type of the target robot based on that the boarding condition of the target robot is inactive. The electronic device may receive a request from the user who uses the target robot, based on that the target robot is a delivery robot. For example, the request of the user may include at least one of a delivery request, a stop request, a call request, or an urgent request, or any combination thereof. The electronic device may skip determination of the boarding condition of the target robot, based on that the request of the user has been identified as an urgent request. In detail, the electronic device may skip the boarding condition in an inactive state and perform operations described later, based on that the request of the user has been identified as the urgent request. The electronic device may transmit a boarding command to the target robot such that the target robot may board the transport apparatus, based on that the determination of the boarding condition has been skipped. Here, the electronic device may transmit at least one of the identification information of the target robot, the boarding point of the target robot, the get-off point of the target robot, or the movement information of the transport apparatus, or any combination thereof, to the target robot, based on that the determination of the boarding condition has been skipped.

Figure 6:
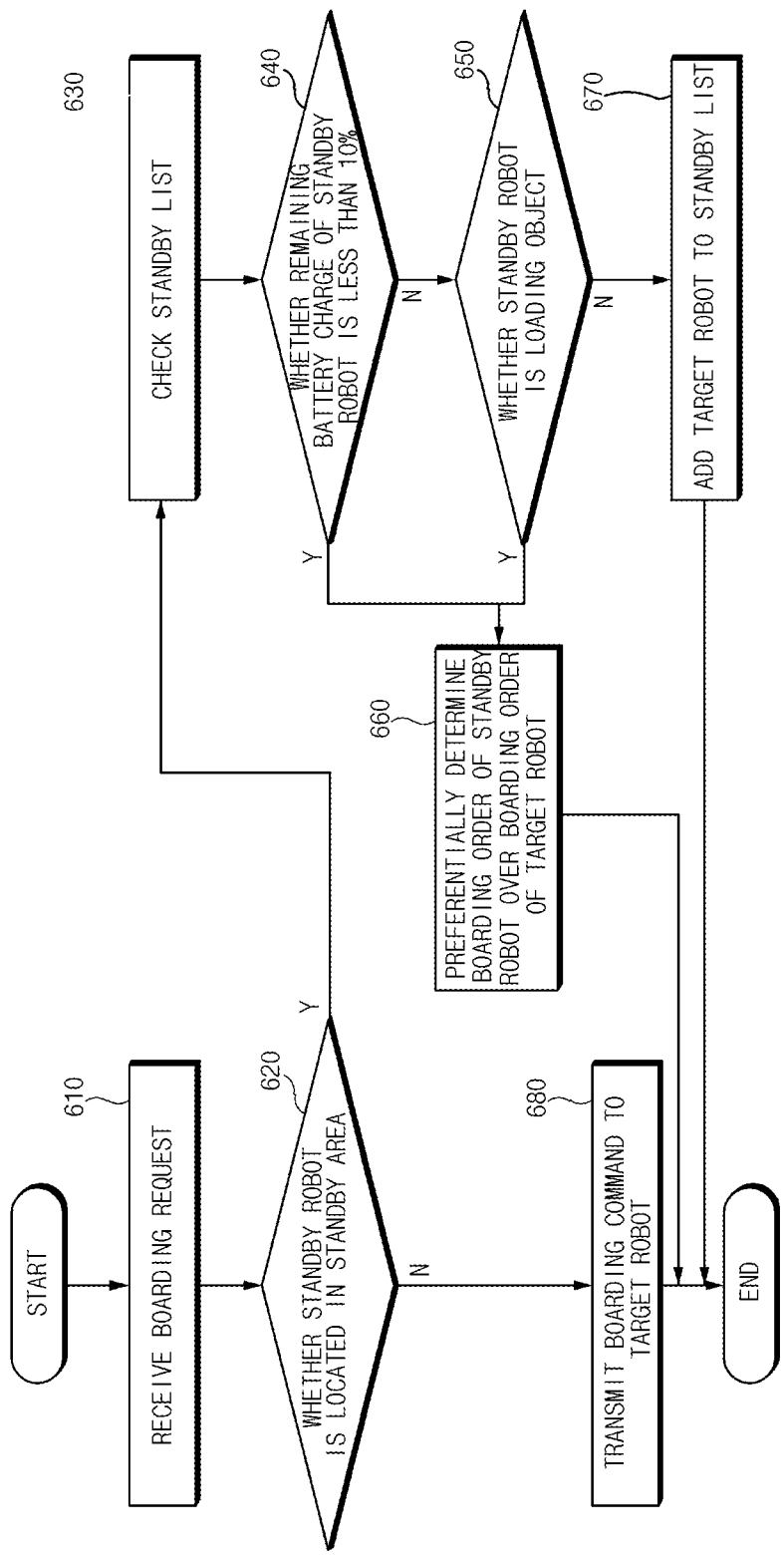
FIG. 6 is a flowchart illustrating a method for determining a boarding order of a target robot in an electronic device according to an embodiment of the present disclosure.

FIG. 6 is a flowchart illustrating a method of determining a boarding order of a target robot in an electronic device according to an embodiment of the present disclosure.

In operation 610, an electronic device (e.g., the electronic device 100 of FIG. 1) according to an embodiment may receive a boarding request in operation 610.

In operation S620, the electronic device may determine whether a standby robot is located in a standby area, based on that a boarding request has been received. Here, if no standby robot is present in the standby area, the electronic device may transmit a boarding command to the target robot in operation 680.

In operation 630, the electronic device may check the standby list if a standby robot is present in the standby area. For example, the electronic device may identify the list of the robots that waits for the transport apparatus which the target robot is to board by checking the standby list.

In operation 640, the electronic device may identify a remaining battery charge of the standby robot. For example, in operation 660, the electronic device may preferentially determine the boarding order of the standby over the boarding order of the target robot, based on that the remaining battery charge of the standby robot is less than a predetermined value.

In operation 650, the electronic device may determine whether the standby robot is loading an object based on that the remaining battery charge of the standby robot is a predetermined value or more. Here, if the standby robot is loading an object, in operation 660, the electronic device may preferentially determine the boarding order of the standby robot over the boarding order of the target robot.

In operation 670, the electronic device may add the target robot to the standby list if the remaining battery charge of the standby robot is a predetermined value or more and there is no item being loaded by the standby robot. In detail, the electronic device may perform the following operations to add the target robot to the standby list. The electronic device may identify at least one of the remaining battery charge of the target robot, the type of the target robot, or the service state of the target robot, or any combination thereof from the state information. The electronic device may determine the boarding order of the target robot based on at least one of the remaining battery charge of the target robot, the type of the target robot, or the service state of the target robot, or any combination thereof. The electronic device may determine the boarding order of the standby robot based on at least one of the remaining battery charge of the standby robot, the type of the standby robot, or the service state of the standby robot, or any combination thereof. In other words, the electronic device may determine the boarding orders of the standby robot and the target robot before adding the target robot to the standby list.

Figure 7:
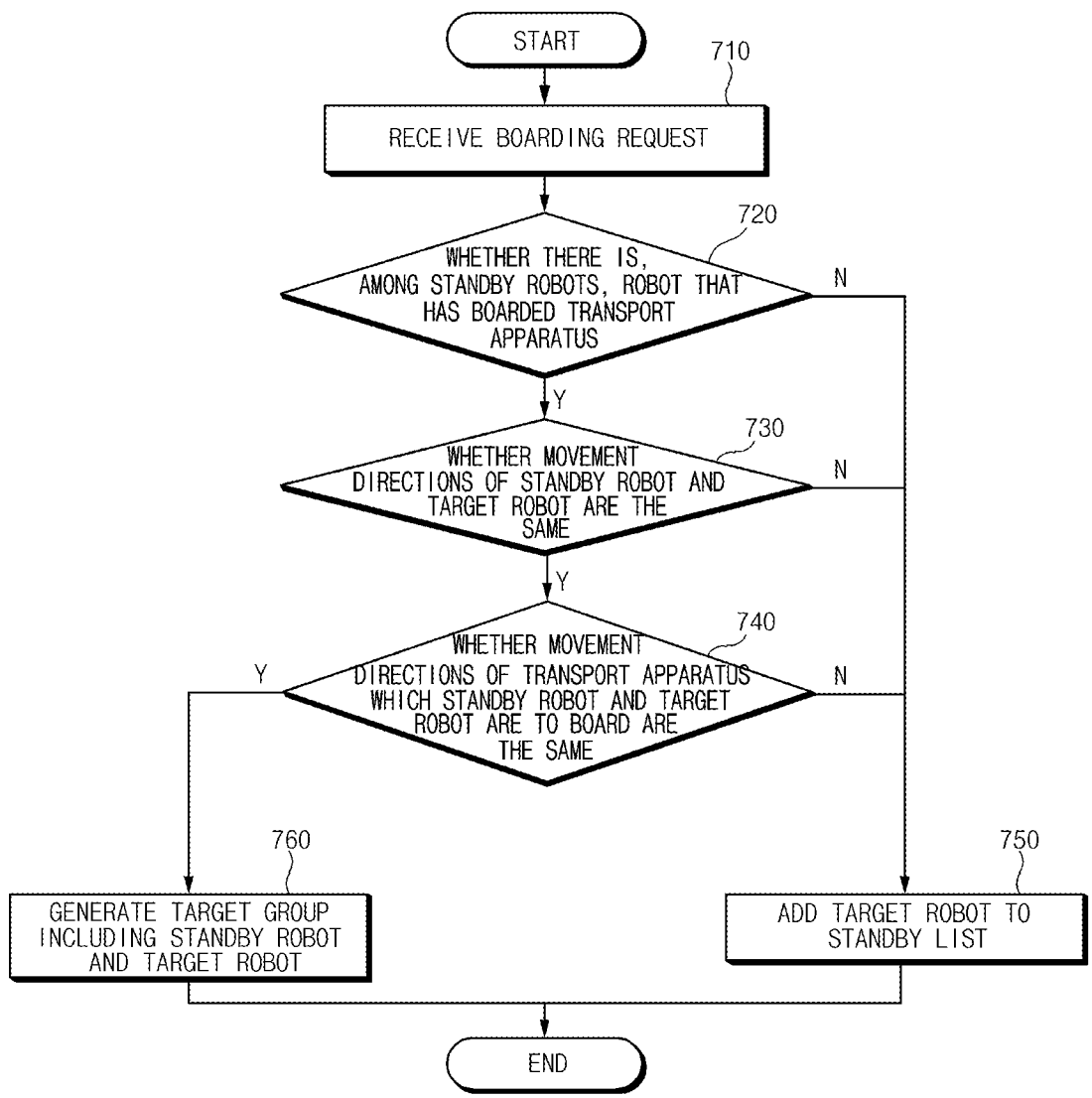
FIG. 7 is a flowchart illustrating a method for generating a target group in an electronic device according to an embodiment of the present disclosure.

FIG. 7 is a flowchart illustrating a method of creating a target group in an electronic device according to an embodiment of the present disclosure.

An electronic device (e.g., the electronic device 100 in FIG. 1) according to an embodiment may receive a boarding request from a target robot in operation 710. The electronic device may generate a target group through the following operations based on that the boarding request has been requested. For example, the target group may refer to a group including a target robot and robots that are different from the target robot. The electronic device may control the robots included in the target group to collectively board a transport apparatus.

In operation 720, the electronic device may determine whether there is, among standby robots, a robot that has boarded the transport apparatus. For example, if there is, among the standby robots, a robot that has boarded the transport apparatus, the electronic device may add the target robot to the standby list in operation 750. Here, the electronic device may not generate the target group based on that the target robot has been added to the standby list.

In operation 730, the electronic device may determine whether the movement directions of the standby robot and the target robot are the same, based on that, among the standby robots, a robot that has boarded the transport apparatus. For example, if the movement directions of the standby robot and the target robot are the same, the electronic device may collectively control the two robots by including them in one group (i.e., control movement and/or boarding with the transport apparatus). If there is, among the standby robots, a robot that is boarding the transport apparatus, the electronic device may add the target robot to the standby list in operation 750.

In operation 740, the electronic device may determine whether the movement directions of the transport apparatus which the standby robot and the target robot are to board are the same. For example, if the movement directions of the target robot and the standby robot are the same and the movement direction of the transport apparatus which the two robots are to board are the same, the electronic device may include the two robots in one group and control them collectively (i.e., movement and/or boarding controls are made by using the transport apparatus).

In operation 760, the electronic device may generate a target group including the standby robot and the target robot by performing operations 720 to 740. In detail, in operation 760, the electronic device may generate the target group including the standby robot and the target robot, based on the movement information of the standby robot, the movement information of the transport apparatus which the standby robot is to board, and the state information of the target robot. The electronic device may transmit a boarding command to the robots included in the target group such that they board the transport apparatus. Unlike this, if there is, among the standby robots, a robot that is boarding the transport apparatus, in operation 750, the electronic device may add the target robot to the standby list.

Figure 8:
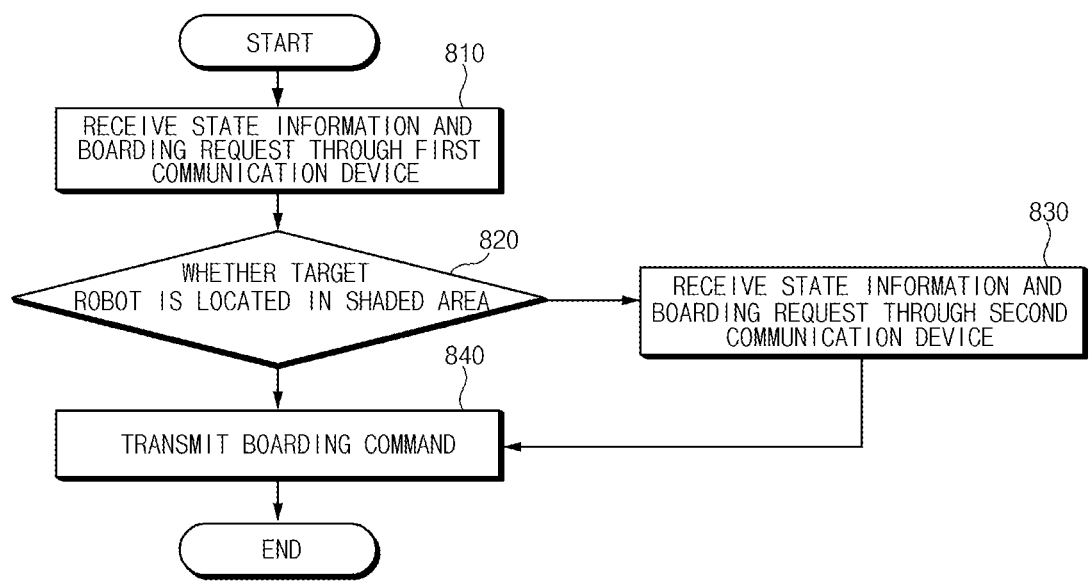
FIG. 8 is a flowchart illustrating a method for receiving state information and a boarding request through a first communication device and a second communication device in an electronic device according to an embodiment of the present disclosure.

FIG. 8 is a flowchart illustrating a method for receiving state information and a boarding request through a first communication device and a second communication device in an electronic device according to an embodiment of the present disclosure.

In operation 810, an electronic device (e.g., the electronic device 100 of FIG. 1) according to an embodiment may receive state information and a boarding request through the first communication device. The communication device (e.g., the communication device 130 in FIG. 1) may include the first communication device and the second communication device. A description of the second communication device will be described later in operation 830 below.

In operation 820, the electronic device may determine whether the target robot is located in a shaded area. For example, the shaded area may include an area, in which communication between the target robot and the electronic device through the first communication device is restricted. In detail, the electronic device may determine whether the target robot is located in the shaded area based on at least one of an intensity of a signal received through the first communication device or a latency of the signal, or any combination thereof.

In operation 830, the electronic device may receive state information and a boarding request through a second communication device for short-distance communication based on that the target robot is located in a shaded area. The second communication device may include a communication device that is different from the first communication device. In detail, the second communication device may refer to a device that is related to long-distance communication, and may include wireless LAN (Wi-Fi), Bluetooth, ZigBee, Wi-Fi Direct (WFD), ultra-wideband (UWB), infrared Data Association (IrDA), Bluetooth low energy (BLE), near field communication (NFC), but the present disclosure is not limited thereto.

In operation 840, the electronic device may transmit a boarding command to the target robot. In detail, the electronic device may transmit a boarding command to the target robot through at least one of the first communication device or the second communication device, depending on whether the target robot is located in the shaded area.

Figure 9:
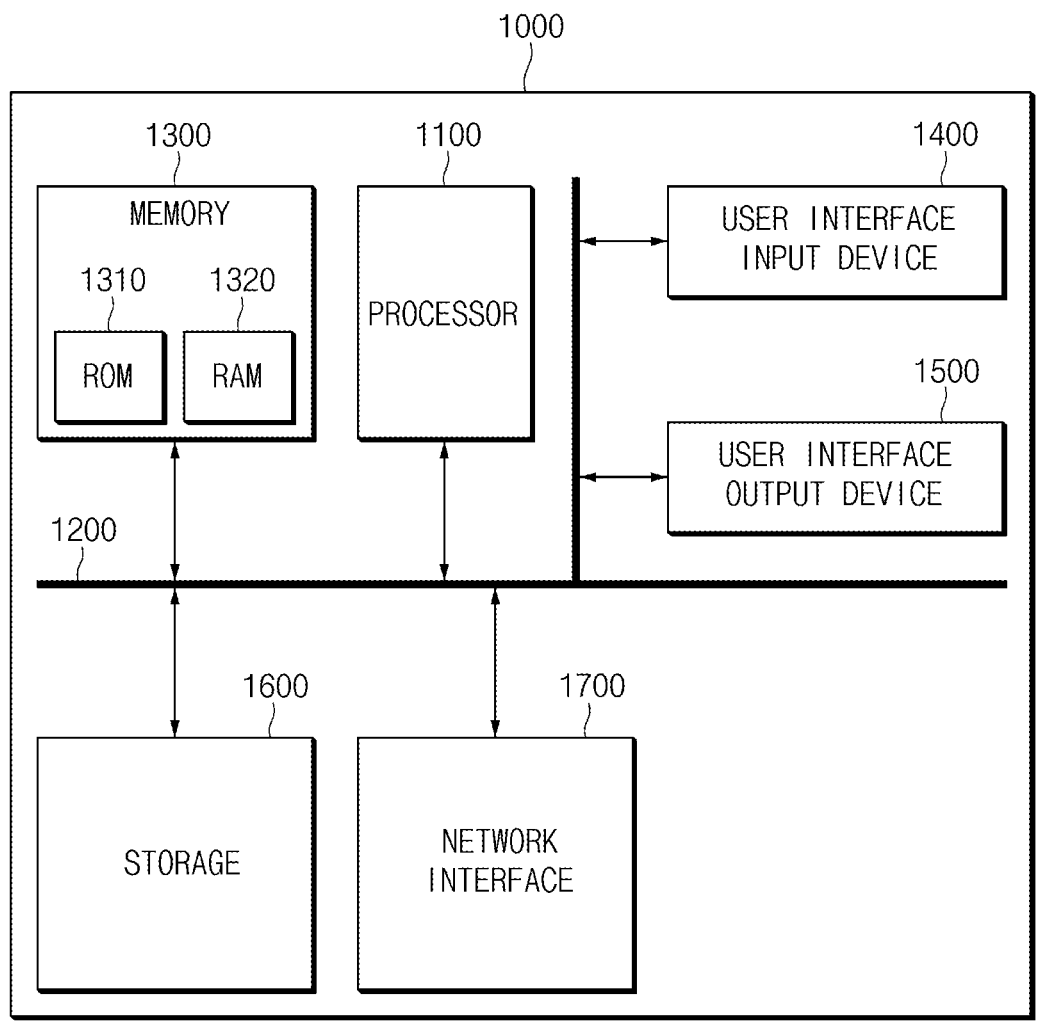
FIG. 9 is a view illustrating a computing system related to an electronic device or a control method according to an embodiment of the present disclosure.

FIG. 9 is a view illustrating a computing system related to an electronic device or a control method according to an embodiment of the present disclosure.

Referring to FIG. 9, a computing system 1000 related to the electronic device or the control method for some example embodiments may include at least one processor 1100, a memory 1300, a user interface input device 1400, a user interface output device 1500, a storage 1600, and a network interface 1700, which are connected with each other via a bus 1200, any combination of or all of which may be in plural or may include plural components thereof.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) and a RAM (Random Access Memory).

Thus, the operations of the method or the algorithm described in connection with the example embodiments disclosed herein may be embodied directly in hardware or a software module executed by the processor 1100, or in a combination thereof. The software module may reside on a storage medium (that is, the memory 1300 and/or the storage 1600) such as a RAM memory, a flash memory, a ROM memory, an EPROM memory, an EEPROM memory, a register, a hard disk, a removable disk, a CD-ROM.

The example storage medium may be coupled to the processor 1100, and the processor 1100 may read information out of the storage medium and may record information in the storage medium. Alternatively, the storage medium may be integrated with the processor 1100. The processor and the storage medium may reside in an application specific integrated circuit (ASIC). The ASIC may reside within a user terminal. In another case, the processor and the storage medium may reside in the user terminal as separate components.

The above explanation is merely an illustrative explanation of technical ideas of the present disclosure by way of some example embodiments, and those skilled in the art in the technical field, to which the present disclosure pertains, may make various modifications and variations without departing from the spirit of the present disclosure.

The example embodiments described above may be implemented with hardware components, software components, and/or a combination of hardware components and software components. For example, the devices, methods, and components described in the example embodiments may be implemented by using a general-purpose computer or a special-purpose computer, such as, a processor, a controller, an arithmetic logic unit (ALU), a digital signal processor, a microcomputer, and a field programmable gate array (FPGA), a programmable logic unit (PLU), a microprocessor, or any other device capable of executing and responding to instructions. The processing device may execute an operating system (OS) and software applications running on the operating system. Additionally, the processing device may access, store, manipulate, process, and generate data in response to execution of software. For ease of understanding, a single processing device may be described as being used; however, those skilled in the art will understand that a processing device includes multiple processing elements and/or multiple types of processing elements, together and/or distributed. For example, the processing device may include multiple processors or one processor and one controller. Furthermore, other processing configurations, such as parallel processors, are possible.

Software may include a computer program, code, instructions, or a combination of one or more of these, which may configure a processing device to operate as desired, or may be processed independently or collectively. Software and/or data may be embodied permanently or temporarily in any type of machine, component, physical device, virtual equipment, computer storage medium or device, or a transmitted signal wave to be interpreted by the processing device or provide commands or data to the processing device. Software may be distributed over networked computer systems and stored or executed in a distributed manner. Software and data may be stored on a computer-readable recording medium.

A method according to an embodiment may be implemented in a form of program instructions that may be executed through various computer systems and recorded on a computer readable medium. The computer readable medium may include program instructions, data files, data structures, and the like, singly or in combination, and the program instructions recorded on the medium may be specially designed and constructed for the embodiment or may be known and available to those skilled in the art of computer software.

Examples of computer readable recording media include hardware devices specifically configured to store and execute program instructions, magnetic media, such as hard disks, floppy disks, and magnetic tapes, optical media, such as CD-ROMs and DVDs, and magnetic media, such as floptical disks, ROM, RAM, flash memory, and the like. Examples of program instructions include machine language code, such as that produced by a compiler, as well as high-level language code that may be executed by a computer by using an interpreter.

The hardware devices described above may be configured to operate as one or a plurality of software modules to perform the operations of the embodiments, and vice versa.

Some advantages of the electronic device and the control method according to some embodiments of the present disclosure will be described as follows.

According to at least one of the embodiments of the present disclosure, a boarding condition of a target robot may be determined through a comparison between a boarding order of a standby robot that is different from the target robot and is located in a standby area and a boarding order of the target robot whereby the target robot and the standby robot do not directly communicate with a transport apparatus whereby a burden on a server of the transport apparatus may be reduced, a call of an API for each type of the robot may be omitted, and development costs of the robot may be reduced.

According to at least one of the embodiments of the present disclosure, a boarding order of the target robot may be determined based on at least one of a remaining battery charge of the target robot, a type of the target robot, or a service state of the target robot, or any combination thereof, from state information, whereby a bottle neck phenomenon that occurs due to the robots that are waiting for boarding in an interior of a transport apparatus or in a space, in which the transport apparatus is located, may be solved, and a quality of a service may be improved by preferentially determining a boarding order depending on an emergency for each service of the robot.

According to at least one of the embodiments of the present disclosure, a first communication device or a second communication device may be determined based on at least one of an intensity of a signal or a latency of the signal, or any combination thereof for communication with a robot whereby interruption of a network due to an issue, such as a shielded and/or shaded area when a robot moves to a destination after boarding.

As described above, although the example embodiments have been described with limited drawings, those skilled in the art may apply various technical modifications and variations based on this. For example, the described techniques are performed in an order different from the described method, and/or adequate results may be achieved even though components of the described system, the structure, the device, the circuit, and the like are coupled or combined in a form that is different from the described method, or they are replaced or substituted by other components or equivalents.

Therefore, other implementations, other embodiments, and equivalents to the claims can also fall within the scope of the claims described below.

Therefore, the example embodiments of the present disclosure are provided to explain the spirit and scope of the present disclosure, but not to necessarily limit them, so that the spirit and scope of the present disclosure is not necessarily limited by the embodiments. The scope of the present disclosure can be construed on the basis of the accompanying claims, and all the technical ideas within the scope equivalent to the claims can be included in the scope of the present disclosure.

What is claimed is:

1. An electronic device comprising:
   one or more processors; and
   a storage medium storing computer-readable instructions that, when executed by the one or more processors, enable the one or more processors to:
   receive target robot state information and a target robot boarding request of a target robot that is to board a transport apparatus, from the target robot,
   determine a target robot boarding condition of the target robot, through comparison of a standby robot boarding order of a standby robot and a target robot boarding order of the target robot, wherein the standby robot is different from the target robot, and wherein the standby robot is located in a standby area, and
   transmit a get-off command to the target robot for the target robot to get off from the transport apparatus, based on a destination of the transport apparatus on which the target robot has boarded, depending on the target robot boarding condition.

2. The electronic device of claim 1, wherein the instructions further enable the one or more processors to:
   transmit a target robot movement command to the target robot for the target robot to move to the standby area, based on that the standby robot located in the standby area is identified; and
   transmit a target robot boarding command and transport apparatus information to the target robot for the target robot to board the transport apparatus, based on that the standby robot located in the standby area is not identified or based on the target robot boarding condition of the target robot.

3. The electronic device of claim 1, wherein the instructions further enable the one or more processors to:
   identify one of or any combination of a target robot remaining battery charge of the target robot, a target robot type of the target robot, and a target robot service state of the target robot, from the target robot state information;
   determine the target robot boarding order of the target robot, based on one of or any combination of the target robot remaining battery charge of the target robot, the target robot type of the target robot, and the target robot service state of the target robot; and
   determine the standby robot boarding order of the standby robot, based on one of or any combination of a standby robot remaining battery charge of the standby robot, a standby robot type of the standby robot, and a standby robot service state of the standby robot.

4. The electronic device of claim 1, wherein the instructions further enable the one or more processors to:
   receive a user request of a user who uses the target robot, based on the target robot being a delivery robot;

skip the determination of the target robot boarding condition of the target robot, based on the user request of the user being an urgent user request; and transmit a target robot boarding command to the target robot for the target robot to board the transport apparatus, based on that the determination of the target robot boarding condition of the target robot has been skipped.

5. The electronic device of claim 1, wherein the instructions further enable the one or more processors to:
through a user interface configured to receive a user request of a user,
receive a target robot request for target robot registration of the target robot, correction of the target robot, and deletion of the target robot, from the user, or
receive setting information on check of the transport apparatus and whether a dedicated operation is possible, from the user.

6. The electronic device of claim 1, wherein the instructions further enable the one or more processors to:
identify a target robot MAC address of the target robot and a target robot secret key of the target robot from the target robot state information, based on that the target robot state information and the target robot boarding request have been received;
perform a target robot authentication on the target robot, based on the target robot MAC address and the target robot secret key; and
determine the target robot boarding condition of the target robot, based on that the target robot is an authenticated robot.

7. The electronic device of claim 6, wherein the instructions further enable the one or more processors to:
generate a json web token (JWT) regarding the target robot authentication of the target robot, based on the target robot MAC address and the target robot secret key;
perform a verification on a signature of the JWT; and
identify a payload included in the JWT based on that the verification of the signature has been performed.

8. The electronic device of claim 1, wherein the instructions further enable the one or more processors to:
receive the target robot state information and the target robot boarding request, through a first communication device regarding a long-distance communication; and
receive the target robot state information and the target robot boarding request, through a second communication device regarding a short-distance communication, based on one of or both of an intensity of a signal received through the first communication device and a latency of the signal.

9. The electronic device of claim 1, wherein the instructions further enable the one or more processors to transmit at least one of or any combination of target robot identification information of the target robot, a target robot boarding point of the target robot, a target robot get-off point of the target robot, transport apparatus movement information of the transport apparatus, the target robot boarding condition of the target robot, and the standby area of the target robot, based on that the target robot boarding condition of the target robot has been determined.

10. The electronic device of claim 1, wherein the instructions further enable the one or more processors to:
disable a transport apparatus service related to boarding of the target robot for the transport apparatus, based on that the get-off command has been transmitted to the target robot; and generate command data regarding a target robot service that is to be provided by the target robot, at a second time point that is subsequent to a first time point at which the get-off command is transmitted.

11. The electronic device of claim 1, wherein the instructions further enable the one or more processors to:
identify at least one of or both of standby robot movement information of the standby robot and transport apparatus movement information of the transport apparatus on which the standby robot is to board, based on that the standby robot located in the standby area has been identified;
generate a target group including the standby robot and the target robot, based on one of or any combination of the standby robot movement information of the standby robot, the transport apparatus movement information of the transport apparatus on which the standby robot is to board, and the target robot state information of the target robot; and
transmit a target group boarding command for target group robots included in the target group to board the transport apparatus, to the target group robots.

12. A control method comprising:
receiving target robot state information and a target robot boarding request of a target robot that is to board a transport apparatus;
determining a target robot boarding condition of the target robot, through comparison of a standby robot boarding order of a standby robot and a target robot boarding order of the target robot, wherein the standby robot is different from the target robot and wherein the standby robot is located in a standby area; and
transmitting a get-off command to the target robot for the target robot to get off from the transport apparatus, based on a destination of the transport apparatus on which the target robot has boarded, depending on the target robot boarding condition.

13. The control method of claim 12, wherein the transmitting of the get-off command to the target robot includes:
transmitting a target robot movement command to the target robot for the target robot to move to the standby area, based on that the standby robot located in the standby area is identified; and
transmitting a target robot boarding command and transport apparatus information to the target robot for the target robot to board the transport apparatus, based on that the standby robot located in the standby area is not identified or based on the target robot boarding condition of the target robot.

14. The control method of claim 12, wherein the determining of the target robot boarding condition of the target robot includes:
identifying at least one of or any combination of a target robot remaining battery charge of the target robot, a target robot type of the target robot, and a target robot service state of the target robot, from the target robot state information;
determining the target robot boarding order of the target robot, based on at least one of or any combination of the target robot remaining battery charge of the target robot, the target robot type of the target robot, and the target robot service state of the target robot; and
determining the standby robot boarding order of the standby robot, based on at least one of or any combination of a standby robot remaining battery charge of the standby robot, a standby robot type of the standby robot, and a standby robot service state of the standby robot.

15. The control method of claim 12, wherein the determining of the target robot boarding condition of the target robot includes:
receiving a user request of a user who uses the target robot, based on that the target robot is a delivery robot;
skipping the determining of the target robot boarding condition of the target robot, based on that the user request of the user is an urgent request; and
transmitting a target robot boarding command to the target robot for the target robot to board the transport apparatus, in response to the skipping of the determining of the target robot boarding condition of the target robot.

16. The control method of claim 12, wherein the determining of the target robot boarding condition of the target robot includes:
identifying a target robot MAC address of the target robot and a target robot secret key of the target robot from the target robot state information, based on that the target robot state information and the target robot boarding request have been received;
performing a target robot authentication on the target robot, based on the target robot MAC address and the target robot secret key; and
determining the target robot boarding condition of the target robot, based on the performing of the target robot authentication.

17. The control method of claim 16, wherein the determining of the boarding condition of the target robot includes:
generating a json web token (JWT) regarding the target robot authentication of the target robot, based on the target robot MAC address and the target robot secret key;
performing a verification on a signature of the JWT; and
identifying a payload included in the JWT based on performing of the verification of the signature.

18. The control method of claim 12, wherein the receiving of the target robot state information and the target robot boarding request includes:
receiving the target robot state information and the target robot boarding request, via a first communication device regarding a long-distance communication; and
receiving the target robot state information and the target robot boarding request, via a second communication device regarding a short-distance communication, based on one of or both of an intensity of a signal received through the first communication device and a latency of the signal.

19. The control method of claim 12, wherein the determining of the target robot boarding condition of the target robot includes transmitting at least one of or any combination of target robot identification information of the target robot, a target robot boarding point of the target robot, a target robot get-off point of the target robot, movement information of the transport apparatus, the target robot boarding condition of the target robot, and the standby area of the target robot, to the target robot, based on the determining of the target robot boarding condition of the target robot.

20. The control method of claim 12, further comprising:
identifying at least one of or any combination of standby robot movement information of the standby robot and transport apparatus movement information of the transport apparatus on which the standby robot is to board, based on that the standby robot located in the standby area has been identified;
generating a target group including the standby robot and the target robot, based on the standby robot movement information of the standby robot, the transport apparatus movement information of the transport apparatus on which the standby robot is to board, or the target robot state information of the target robot; and
transmitting a target group boarding command for target group robots included in the target group to board the transport apparatus, to the target group robots.

\* \* \* \* \*